United States Patent [19]

Greiner et al.

[11] Patent Number: 4,952,188

[45] Date of Patent: Aug. 28, 1990

[54] METHOD FOR MAKING MASK SUPPORT STRUCTURE FOR A TENSION MASK COLOR CATHODE RAY TUBE

[75] Inventors: Siegfried M. Greiner, Crystal Lake; Raymond G. Capek, Elmhurst, both of Ill.

[73] Assignee: Zenith Electronics Corporation, Glenview, Ill.

[21] Appl. No.: 383,784

[22] Filed: Jul. 21, 1989

Related U.S. Application Data

[63] Continuation-in-part of Ser. No. 178,175, Apr. 6, 1988.

[51] Int. Cl.[5] .......... C03C 27/02

[52] U.S. Cl. .......... 445/30; 65/59.3; 55/52; 55/159

[58] Field of Search .......... 445/30; 55/52, 159; 65/58, 59.5

[56] References Cited

U.S. PATENT DOCUMENTS

| | | | |
|---|---|---|---|
| 3,212,929 | 10/1965 | Pliskin | 65/59.5 X |
| 3,358,422 | 12/1967 | Van Der Schee | 55/52 |
| 3,894,321 | 7/1975 | Moore | 313/402 X |
| 4,351,104 | 9/1982 | Klagane et al. | 65/58 |
| 4,695,761 | 9/1987 | Fendley | 313/407 |
| 4,745,328 | 5/1988 | Strauss | 313/402 |

FOREIGN PATENT DOCUMENTS

| | | | |
|---|---|---|---|
| 2038209 | 2/1987 | Japan | 55/52 |

*Primary Examiner*—Kenneth J. Ramsey

[57] ABSTRACT

A method of making a mask support structure for a cathode ray tube includes the steps of slowly rotating a quantity of sdolder glass paste in a container continuously over an extended period of time so that its viscosity is significantly below an original value, permitting the rotated solder glass paste to stand substantially still until it returns near its original viscosity value, dispensing the solder glass paste in a metallic mask support rail having a generally hollow cross-section, and securing the rail to a CRT faceplate.

11 Claims, 5 Drawing Sheets

METHOD FOR MAKING MASK SUPPORT STRUCTURE FOR A TENSION MASK COLOR CATHODE RAY TUBE

This application is a continuation-in-part of U.S. Ser. No. 178,175 filed Apr. 6, 1988, entitled "FACEPLATE FRONT ASSEMBLY WITH IMPROVED TENSION MASK SUPPORT STRUCTURE".

BACKGROUND OF THE INVENTION

This invention relates to color cathode ray picture tubes and is addressed specifically to an improved method for making front assemblies for color tubes having shadow masks of the tension foil type in association with a substantially flat faceplate. The invention is useful in color tubes of various types, including those used in home entertainment television receivers, and in medium-resolution and high-resolution tubes intended for color monitors.

The use of the foil-type flat tension mask and flat faceplate provides many benefits in comparison to the conventional domed shadow mask and correlatively curved faceplate. Chief among these is a greater power-handling capability which makes possible as much as a three-fold increase in brightness. The conventional curved shadow mask, which is not under tension, tends to "dome" in picture areas of high brightness where the intensity of the electron beam bombardment is greatest. Color impurities result as the mask moves closer to the faceplate and as the beam-passing apertures move out of registration with their associated phosphor elements on the faceplate. The tension mask when heated distorts in a manner quite different from the conventional mask. If the entire mask is heated uniformly, there is no doming and no distortion until tension is completely lost; just before that point, wrinkling may occur in the corners. If only portions of the mask are heated, those portions expand, and the unheated portions contract, resulting in displacements within the plane of the mask; i.e., the mask remains flat.

The tension foil shadow mask is a part of the cathode ray tube front assembly, and is located closely adjacent to the faceplate. The front assembly comprises the faceplate with its screen consisting of deposits of light-emitting phosphors, a shadow mask, and support means for the mask. As used herein, the term "shadow mask" means an apertured metallic foil which may, by way of example, be about 0.001 inch thick, or less. The mask must be supported in high tension a predetermined distance from the inner surface of the cathode ray tube faceplate; this distance is known as the "Q-distance". As is well known in the art, the shadow mask acts as a color-selection electrode, or parallax barrier, which ensures that each of three beams lands only on its assigned phosphor deposits.

The requirements for a support means for a foil shadow mask are stringent. As has been noted, the foil shadow mask is normally mounted under high tension, typically 30 lb/inch. The support means must be of high strength so the mask is held immovable because an inward movement of the mask of as little as 0.0002 inch can cause the loss of guard band. Also, it is desirable that the shadow mask support means be of such configuration and material composition as to be compatible with the means to which it is attached. As an example, if the support means is attached to glass, such as the glass of the inner surface of the faceplate, the support means must have a coefficient of thermal expansion compatible with the glass, and by its composition, be bondable to glass. Also, the support means should be of such composition and structure that the mask can be secured to it by production-worthy techniques such as electrical resistance welding or laser welding. Further, it is essential that the support means provide a suitable surface for mounting and securing the mask. The material of which the surface is composed should be adaptable to machining or other forms of shaping so that it can be contoured into near-perfect flatness so that no voids between the metal of the mask and the support structure can exist to prevent the positive, all-over contact required for proper mask securement.

Means for securing the shadow mask support to the inner surface of the faceplate may comprise a cement in the form of a devitrifying glass solder. (Solder glasses are also commonly known as "frits"). While satisfactory in the main, a cement of this type has significant disadvantages in that it is difficult to handle and apply in production, and it tends to create "pockets" in which screening fluids may lodge and be released later as contaminants. The cathodes of the electron gun are particularly susceptible to poisoning from contaminants. Also, deep-lying ones of such pockets may be connected to the surface of the solder glass by a tiny conduit. The air retained in the pocket may not be depleted during the exhaust cycle, but slowly leak out through the conduit after the tube is sealed, resulting in a reject as a "gassy" tube.

In U.S. Pat. No. 3,894,321 to Moore, of common ownership herewith, there is disclosed means for mounting a foil shadow mask on "rails" which extend from the faceplate. In another embodiment, the faceplate is shown as having an inner ledge that forms a continuous path around the tube, the top surface of which is a Q-distance away from the faceplate for receiving the foil mask.

In U.S. Pat. No. 4,695,761 to Fendley, of common ownership herewith, a foil shadow mask support structure is disclosed in which the structure has a cross-section in the form of an inverted "V", the narrow end of which provides for receiving the mask, and wherein the wide, open end is secured to the faceplate. The means of securement is by fillets of solder glass. Other foil mask support structure embodiments are also disclosed, such as a hollow tube and a rectangle.

In U.S. Ser. No. 942,336, filed Dec. 16, 1986, now U.S. Pat. No. 4,745,328 issued May 17, 1988, of common ownership herewith, there is disclosed a support structure for a tensed foil shadow mask comprising an inverted channel member of metal with a stiffening core of a material such as ceramic secured within, and lateral to, the channel member. In one embodiment of the invention, the space between the stiffening core and the inner walls of the channel is filled with a devitrified glass frit. In another embodiment, a ceramic slurry is poured into a V-shaped support member and is allowed to set, with the object of stiffening the support structure. Except for the area of the structure that contacts the faceplate, the ceramic is totally enclosed within the support structure. A devitrified glass frit may be used as a stiffening material, similarly enclosed within the structure.

In the patent application, U.S. Ser. No. 178,175, filed Apr. 6, 1988, there is disclosed a method for attaching a rectangular rail with a generally V-shape cross-section to a CRT faceplate by partly filling the rail initially with a low viscosity solder glass and after drying overfilling it with a high viscosity solder glass.

The low viscosity initially dispensed solder glass described in this method is suggested as sealing glass No. 7950 manufactured by Corning Glass Works, or alternatively a low viscosity glass designated CV-685 manufactured by Owens-Illinois Television Products. This low viscosity solder glass is sometimes referred to as the "filler frit". The high viscosity solder glass, which overfills the rail when dispensed, is suggested in this application as alternatively being Corning premixed sealing glass No. PM7590 or solder glass CV-695 manufactured by Owens-Illinois. These have viscosities in the range of 500 to 700 poise, while the low viscosity solder glasses are in the range of 160,000 to 240,000 centipoise.

While the method described in this parent application has been found acceptable in production, there have been a margin of tube rejects due in part to voids created in the solder glass in both the filler frit and the high viscosity outer frit.

Microphotographs of cross-sections through the rails and frit indicate voids of 0.010 to 0.020 inches across, and any of these voids near the surface of the seal fillet are subject to bursting when the tube is exhausted in preparation for applying an aluminized coating over the rail seal.

All of the completed CRT tubes are tested for the presence of a residual gas in the faceplate funnel envelope, but these bursting voids are too small to cause a test responsive residual gas reject, and hence, in many cases remain undetected. However, even though residual gas presence remains undetected, the bursting voids cause charged particles in the tube, as well as plugged masks. It has been observed that the solder glass particles coming out of the rail seal at bursting are not as harmful as the burst particles of aluminum coating over the seal that are torn loose upon void burst.

Another problem in the attachment of mask supporting rails to faceplates utilizing this two-layer glass solder system is the formation of air entraining voids formed in the filler frit directly at the periphery of the rail near its apex.

During processing of the tube, small fissures form connecting some of these small voids with the main volume of the tube. Since these small voids are difficult to pump through the restricted fissures, they tend to degas into the finished tube giving objectionably high gas pressures. Attempts at defining a solution to this problem were for a long time unfruitful although slowing the frit dispensing rate produced a nominal reduction in these voids.

It is a primary object of the present invention to minimize the production of voids in the frit filling of rails forming the supporting structure for tension masks in CRTs.

BRIEF DESCRIPTION OF THE DRAWINGS

The features of the present invention which are believed to be novel are set forth with particularity in the appended claims. The invention, together with further objects and advantages thereof, may be best understood by reference to the following description taken in conjunction with the accompanying drawings (which are not to scale), in the several Figures of which like reference numerals identify like elements, and in which:

DESCRIPTION OF THE PREFERRED EMBODIMENT

In accordance with the present invention, an improved method is provided for making a CRT tension mask support structure with a faceplate mounted hollow metal alloy rail filled with solder glass, where the solder glass is pre-treated in paste form by slowly rolling in its as-packaged container for 8 to 12 hours and thereafter permitting it to stand for another 12 hours to return it to its original viscosity.

The above-described voids that cause charged particles in the tubes and plugged masks have been traced to air being entrapped in the solder glass paste both during its original processing and by its old pre-treatment process. This has been found particularly true for the premixed secondary paste used on the top of the filler paste that seals the rail to the front panel or faceplate. The sealing paste is purposely formulated to have a high viscosity, greater than 600 poise, and the material as received from the solder glass manufacturer has been shown to have numerous air pockets, and to compound this problem the manufacturer's procedure of mixing the paste prior to use in a paint shaker entraps even more air.

To eliminate this problem, the as-packaged one gallon containers of paste are rotated in a rolling mill at 4 rpm for 8 to 12 hours and then the container stands for another 12 hours. The paste is then used to fill the rails with no further shaking but with a slow 4 rpm stir by the dispensing machine itself. The very slow rolling for 8 to 12 hours greatly reduces the viscosity and allows the air bubbles to move in the paste and as the surface of the paste gently changes, the bubbles can escape. The standing time is necessary to regain the approximate 600 poise viscosity.

This process has been found to significantly reduce tube rejects resulting from plugged masks and charged particles.

Figure 1:
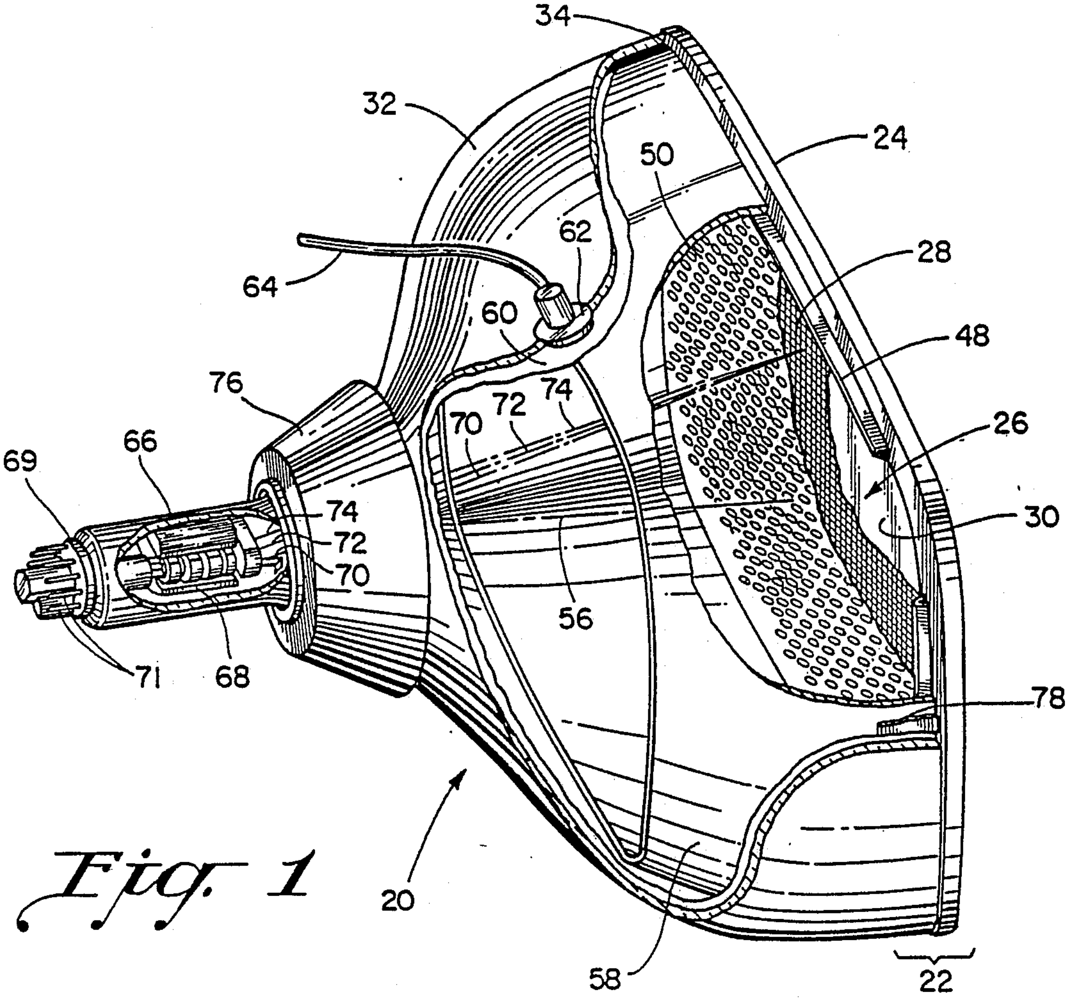
FIG. 1 is a side view in perspective of a color cathode ray tube having a shadow mask support structure, with cut-away sections that indicate the location and relation of the structure to other major tube components.

A cathode ray tube having a faceplate assembly according to the invention with an improved structure for supporting a tensed foil shadow mask is depicted in FIG. 1. The tube and its component parts are identified in FIGS. 1, 2 and 3, and described in the following paragraphs in this sequence: reference number, a reference name, and a brief description of structure, interconnections, relationship, functions, operation, and/or result, as appropriate.

20—color cathode ray tube
22—faceplate assembly
24—glass faceplate
26—inner surface of faceplate
28—centrally disposed phosphor screen
30—film of aluminum
32—funnel
34—peripheral sealing area of faceplate 24, adapted to mate with the peripheral sealing area of the mouth of funnel 32
48—shadow mask support structure located on opposed sides of the screen 28 for receiving and securing a tensed foil shadow mask; the support structure is depicted by way of example as comprising a unitary structure
50—metal foil shadow mask; after being tensed, the mask is mounted on support structure 48 and secured thereto
52—shadow mask apertures, shown greatly enlarged in the inset for illustrative purposes only
56—anterior-posterior axis of tube
58—magnetic shield, internal (a magnetic shield may also be installed external to the tube envelope)
60—internal conductive coating on funnel
62—anode button
64—high voltage conductor
66—neck of tube
68—in-line electron gun providing three discrete in-line electron beams 70, 72 and 74 for exciting the respective red-light-emitting, green-light-emitting, and blue-light-emitting phosphor deposits on screen 28
69—base of tube
71—metal pins for conducting operating voltages, and video and sweep signals, through base 69 to the electron gun 68
76—yoke which provides for the traverse of beams 70, 72 and 74 across screen 28
78—contact spring which provides an electrical path between the funnel coating 60 and the mask support structure 48.

Figure 2:
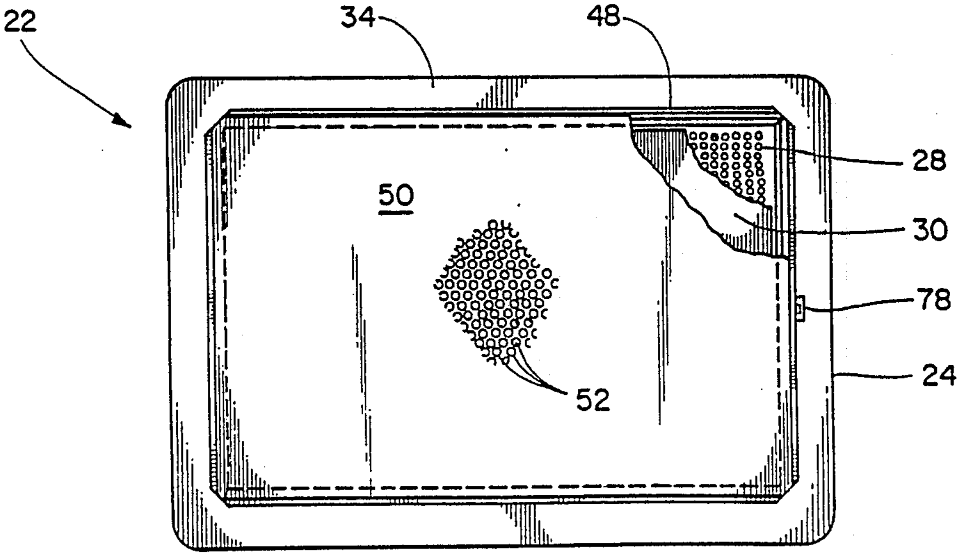
FIG. 2 is a plan view of the front assembly of the tube shown by FIG. 1, with parts cut away to show details of the relationship of the embodiment of the mask support structure shown by FIG. 1 with the faceplate and the shadow mask; an inset depicts the mask apertures greatly enlarged.
Figure 3:
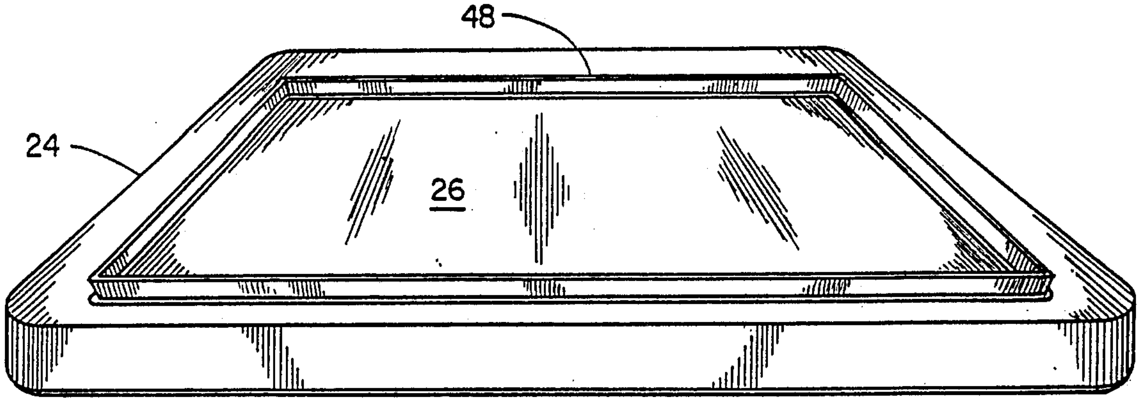
FIG. 3 is a view in perspective of the faceplate depicted in FIGS. 1 and 2, and showing in greater detail the location and orientation of a shadow mask support structure according to the invention as secured to the faceplate.

As indicated by FIGS. 1 and 2, a faceplate assembly 22 for a cathode ray tube 20 includes a glass faceplate 24 having on its inner surface 26 a centrally disposed phosphor screen 28. A foil shadow mask 50 is mounted in tension on shadow mask support structure 48 located around screen 28, and secured to the inner surface 26. A faceplate 24 without the shadow mask, but with a mask support structure 48 secured to the inner surface 26, is depicted in FIG. 3.

Figure 4:
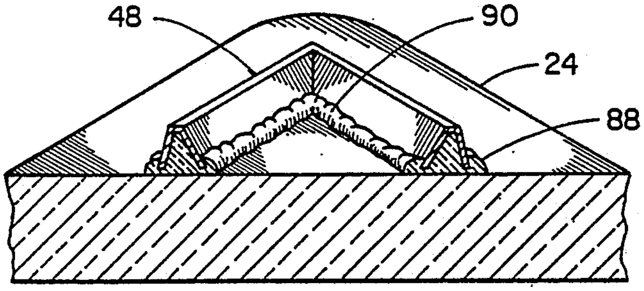
FIG. 4 is a cut-away perspective view of a corner section of the embodiment of the shadow mask support structure depicted in FIGS. 1-3.
Figure 5:
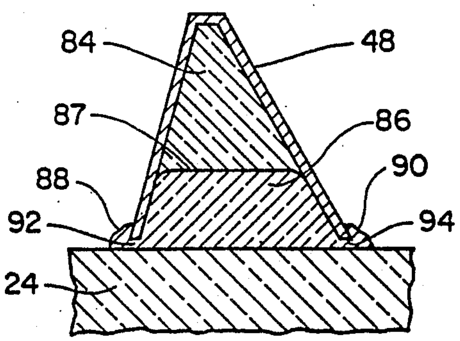
FIG. 5 is a sectional view in elevation indicating the distribution of devitrified solder glass within a shadow mask support structure secured to a faceplate.

With reference also to FIGS. 4 and 5, shadow mask support structure 48 is indicated as comprising a hollow shell, or tapered trough of metal, having in the preferred embodiment, a V-shape. The "bottom" of structure 48 (when the structure is inverted) is indicated as being partially filled with a devitrified solder glass 84, noted as being a solder glass of relatively low viscosity when in the form of an undevitrified paste. The remainder of structure 48 is indicated as being completely filled with devitrified solder glass 86, noted as being a solder glass of relatively high viscosity when in the form of an undevitrified paste. A line of demarcation 87 is indicated between devitrified solder glass 84 and devitrified solder glass 86. The distribution of the two solder glasses within the support structure, and their devitrification, is a result of the process to be described.

(It is to be noted that the process is not limited to the embodiment of the support structure depicted, but may be utilized in conjunction with other configurations of hollow support structures such as round or rectangular.)

The devitrified solder glasses 84 and 86 comprise compositions selected to meet the particular requirements of the application. The solder glass 84, indicated as occupying the bottom of structure 48, preferably comprises a solder glass of relatively low viscosity when in the form of an undevitrified paste, such as the solder glass manufactured by Corning Glass Works of Corning, New York, under the designation 7590. Alternately, a relatively low-viscosity solder glass designated as CV-685, and manufactured by Owens-Illinois Television Products Division of Toledo, Oh., may be used. Devitrified solder glass 86, indicated as completely filling the remainder of structure 48, and being a solder glass of relatively high viscosity when in the form of an undevitrified paste, may comprise a premixed solder glass provided by Corning under the designation 7590 PM. Alternately, solder glass CV-695 provided by Owens-Illinois, can be used. Solder glasses of equivalent properties and quality manufactured by other suppliers may also be used.

The viscosity of solder glass in paste form can be measured by viscosimeters such as those manufactured by the Brookfield Engineering Laboratories, Inc. of Stoughton, Mass. under the designation Models LVT and HBT. For the low-viscosity pastes (7590 and CV-685), a Model LVT with a No. 1 spindle and Helilpath Stand Model 20 is used. Viscosity readings of 160,000 to 240,000 centipoise are acceptable. For the high-viscosity pastes (7590 PM and CV-695), a Model HBT with a No. 29 spindle is used; readings of 500 to somewhat over 700 poise are acceptable.

A further test of the rheology of the flow of the solder glass paste is the "bead width" test. The test consists of dispensing the subject paste through an orifice having a diameter of 0.125 inch, and depositing 85±2 grams onto a plate. The width of the resulting bead is measured with a vernier caliper to a precision of 0.001 inch. The preferred range of bead widths of the low-viscosity solder glass pastes is from 0.260 to 0.300 inch. The preferred range of bead widths of the high-viscosity pastes is 0.180 to 0.220, with the best results obtained with pastes having a 0.190 to 0.205 inch bead width.

With reference to FIGS. 4 and 5, an overflow of solder glass from structure 48 is indicated, which provides fillets 88 and 90 of devitrified solder glass extending from structure 48 to seal structure 48 to the faceplate 24. Fillets 88 and 90 comprise seal geometries effective to provide the proper seal.

Gaps 92 and 94 will be noted between the "feet" of structure 48 and the faceplate 24. The width of the gaps may be in the range of 0.001 to 0.005 inches, and preferably about 0.002 inches. It is believed that, without the gaps, spalling of the glass of the faceplate may occur at points of contact with the metal of the support structure. In effect, the intervening solder glass seems to act as a "buffer" to compensate for the differing coefficient of thermal contraction ("CTC") of the metal of the support structure and the glass of the faceplate. The width of the gaps is a function of the quantities of the two solder glass pastes deposited in the support structure, and the shrinkage of the pastes as a result of heating to achieve devitrification.

The metal of the support structure may comprise Alloy No. 27 manufactured by Carpenter Technology of Reading, Pa.; this material has a CTC of approximately 105 to $109\times10^{-7}$ in/in/degree C. over the range of the temperatures required for devitrification—from ambient temperature to 440 degrees C. The glass of the faceplate in turn has a CTC of approximately $103\times10^{-7}$ in/in/degree C. over the designated range. Despite the relative nearness of the coefficients of thermal contraction of the glass and the metal, a gap with a buffer of solder glass between the metal of the mask support and the faceplate is considered necessary.

An important aspect of the present invention is that the solder glass paste of both the filler frit and the sealing frit is prior to dispense, slowly rolled for a substantial period to release entrapped air and then permitted to stand for a substantial period to achieve its original viscosity, although it is more important to roll the premixed solder glass paste of the sealer frit because of its higher viscosity.

Figure 10:
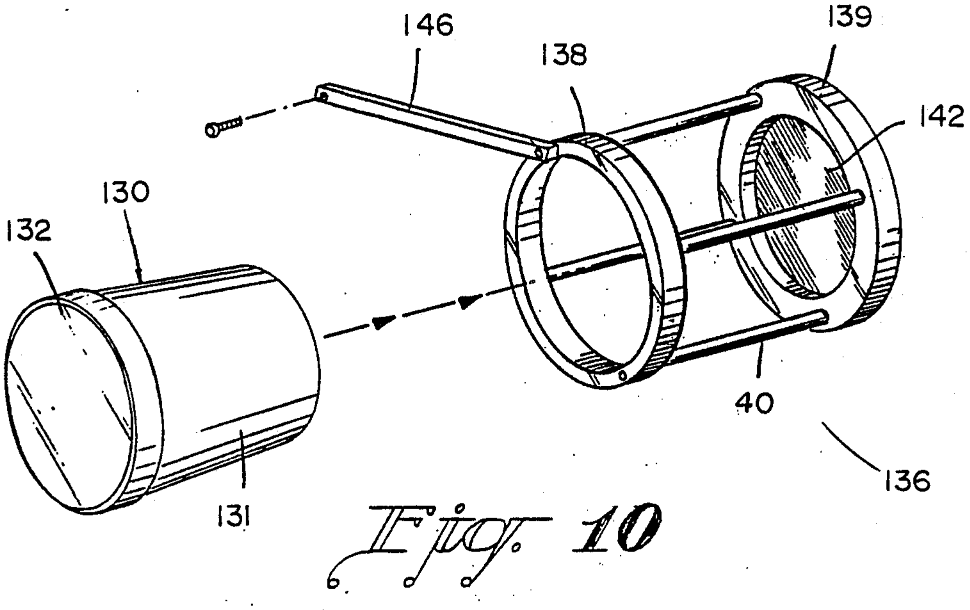
FIG. 10 is an exploded view of a rolling mill holder and a solder glass paste container according to the present invention.
Figure 11:
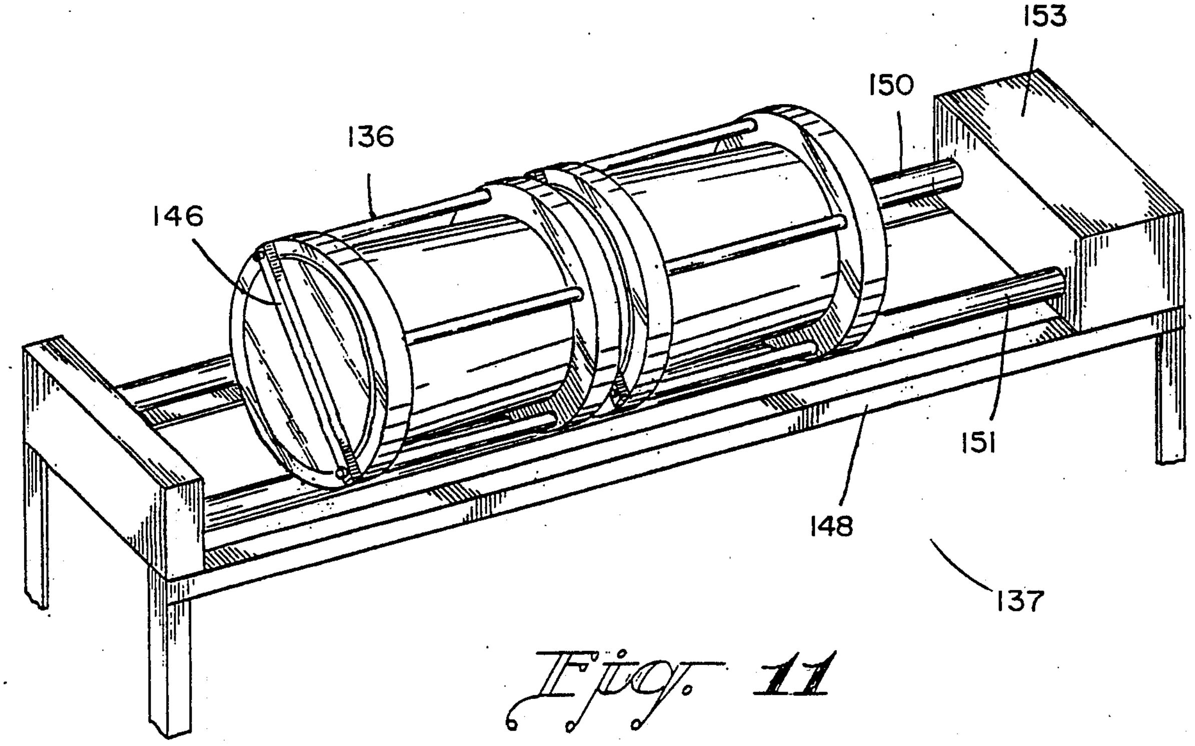
FIG. 11 is a perspective view of two rolling mill holders on a rolling mill according to the present invention.

As seen in FIGS. 10 and 11, a one gallon plastic container 130 of solder glass paste is seen to have a slightly frusto-conical side wall 131 and a cover 132, and the container 130 fits into a holder 136 which is in turn placed on a rolling mill 137 with or without another container for slow rolling about a horizontal axis.

While holder 136 is particularly adapted to the shape of container 130 it should be understood that it may be modified to accommodate other manufacturers' containers. Holder 136 consists of a pair of spaced annular members 138 and 139 spaced and held together by four tie rods 140. Annular member 139 has a recessed bottom wall 142 adapted to fairly closely receive and hold bottom end 144 of container 130, and a pivotal bar 146 is mounted on the top of annular member 138 and serves to engage the top of cover 132 and lock container 130 in the holder. The outer surfaces of annular members 138 and 139 are cylindrical and have equal diameters.

Viewing FIG. 11, the rolling mill 137 consists of an elongated generally horizontal frame 148 that supports a pair of spaced parallel rotary tubes 150 and 151 driven by a motor and suitable gearing in housing 153. The gearing in housing 153 is selected to rotate the holders 136 when placed on the rotating tubes 150 and 151 at 4 revolutions per minute.

The method of solder glass paste pre-treatment provided by the rolling mill 137 under the control of an operator is to rotate the holders 136 with containers 130 at 4 rpm for a period of 8 to 12 hours. The seal first paste is formulated to have a high viscosity somewhat greater than 600 poise, and this slow rolling substantially reduces paste viscosity. This very slow rolling for in excess of 8 hours, while reducing velocity, more importantly permits the air bubbles in the paste to move in the paste to the ever-changing gently moving folding surfaces as the paste container rolls, and this permits the entrained air to easily escape.

Figure 6A:
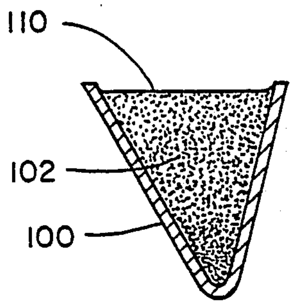
FIG. 6A is a sectional view in elevation depicting the filling of a mask support structure with devitrifying solder glass paste.

Thereafter the paste containers are removed from the holders and permitted to stand for a period of 12 hours, and thereafter the paste is dispensed into a shadow mask support structure or rail 100 without further pre-treatment. The structure 100 is indicated in FIG. 6A as being filled with a devitrifying solder glass paste 102 of relatively low viscosity. (Solder glasses in paste form are indicated symbolically by a dot pattern.)

Figure 6B:
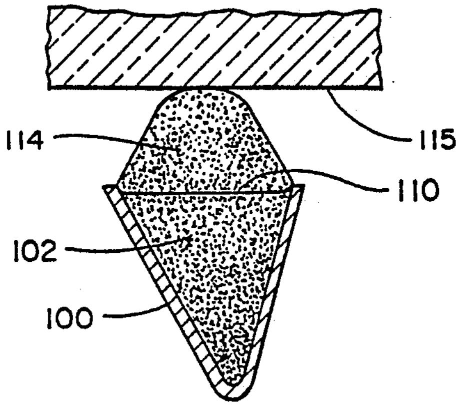
FIG. 6B is a view similar to FIG. 6A but depicting the over-filling of a mask support structure with a second devitrifying solder glass paste having a different property.
Figure 9:
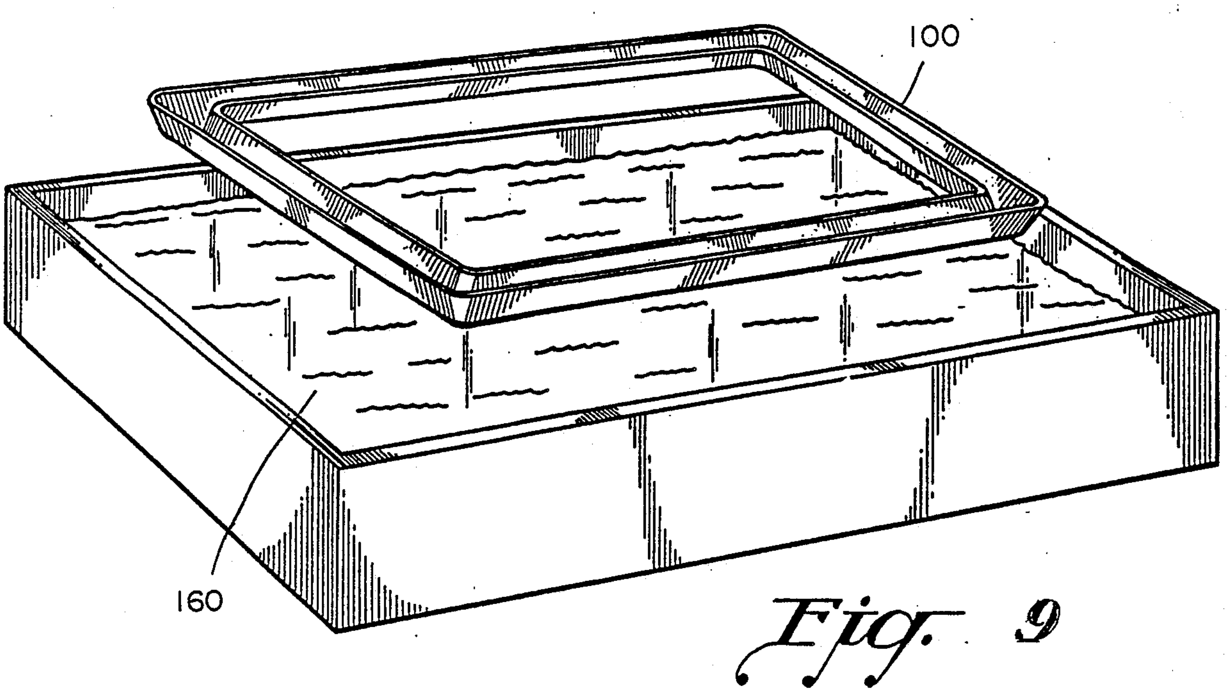
FIG. 9 illustrates a mask support rail as it is being dipped in a wetting agent.

As seen in FIG. 9, the generally V-shape hollow rectangular mask support structure or rail 100 is dipped in a static container of surfactant 160 prior to dispensing solder glass paste or frit into the rail. This wetting-agent lubricator greatly reduces air containing voids at the interface of the filler frit and the rail interior, particularly at the rail apex. After dipping the rail into the surfactant 160 completely coating the interior walls of the rail with surfactant, it is dried and then placed in the following described dispensing machine 104 where the frit is dispensed into the rail with the low viscosity frit 102 being initially dispensed and the high viscosity frit 114 being dispensed over the low viscosity frit as seen in FIG. 6B.

While several surfactants have been found desirable for this purpose, one that has been found significantly superior to others in reducing these voids in the low viscosity initial frit, referred to as filler frit, is one of the octylphenoxypolyethoxyethanol products made by Rohm & Haas Company identified as Triton X-100 recommended by this manufacturer as being a biodegradable household and industrial detergent. This product is utilized in a 2 ½% solution.

Other surfactants have been found to reduce these voids although to a significantly lesser extent. One is a dispersant also manufactured by Rohm & Haas under the trade name "Tamo1". Another is a 50% mixture of a silicone oil manufactured by Dow-Corning under the designation 200 series, a polydimethylsiloxane dissolved in ethylene glycomonobutyl ether acetate (EGMEA).

Figure 7:
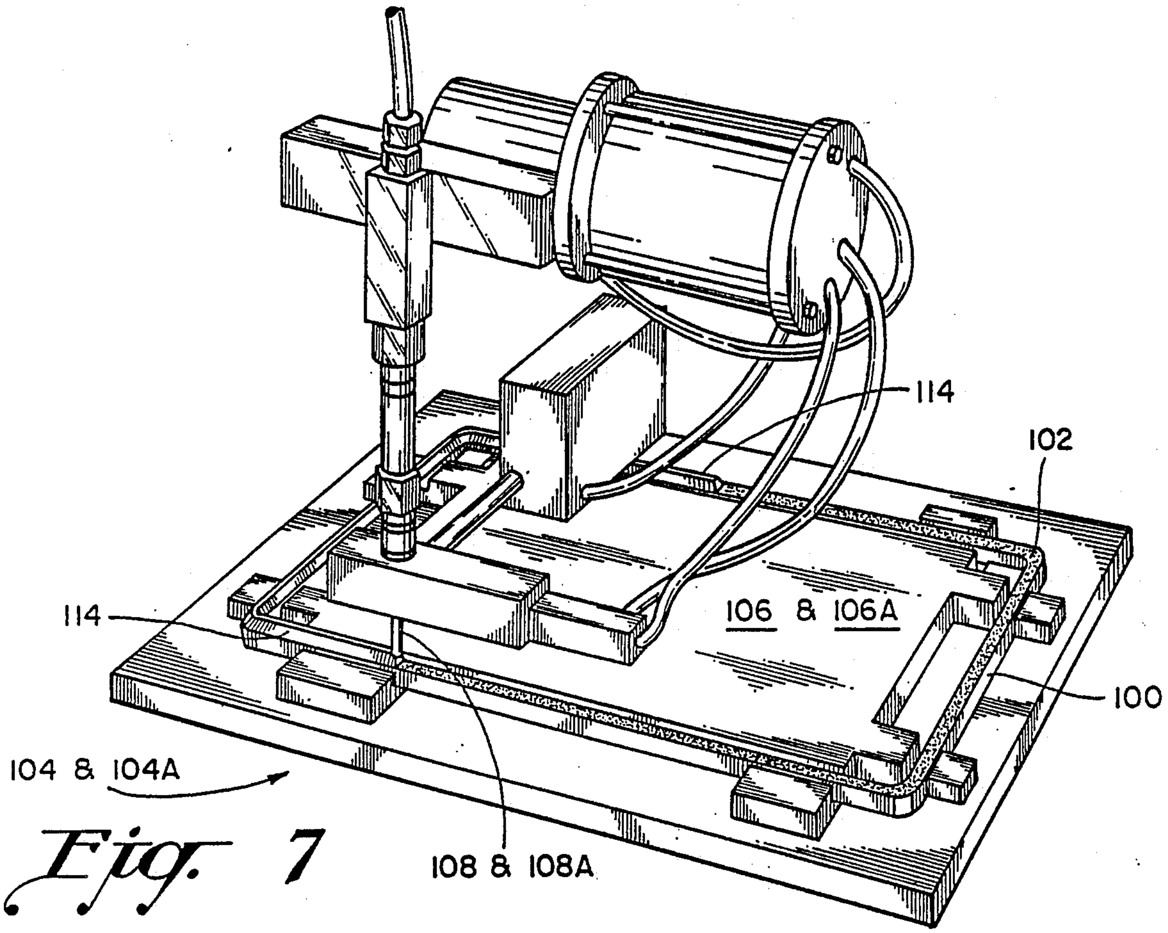
FIG. 7 is a simplified diagrammatic view of a machine for dispensing solder glass paste.

The pre-treated rail 100 is depicted in FIG. 7 as installed in a receiving fixture 106 of the solder-glass-paste dispensing machine 104, indicated diagrammatically. A dispensing head 108 of machine 104 extrudes the pre-treated solder glass in paste form by means of a positive displacement cylinder, and with an accuracy of ±0.1 gram. The dispensing head 108 remains stationary as the rail 100, held in receiving fixture 106, is traversed to receive the dispensed solder glass paste.

Dispensing machine 104 periodically stirs the paste at a slow 4 rpm while the paste is on the machine, and this serves to maintain a homogeneous mixture of vehicle and powdered glass.

It is to be noted that two such dispensing machines are used in the process according to the invention; they are identical except that each in sequence dispenses a solder glass paste of different viscosity; hence, the paste-dispensing heads may have a different orifice diameter. In this description, attribution to the second dispensing machine is indicated by the suffix "A" of the reference numbers that apply to the machine(s).

When installed in first dispensing machine 104, the support structure is filled with devitrifying solder glass paste 102 of relatively low viscosity (indicated by FIG. 6A) by a solder-glass paste-dispensing head 108, which preferably has an orifice size of 0.125 inch. The approximate fill level is indicated by the line 110 in FIG. 6A, which becomes a line of demarcation between two pastes of different viscosity. It is noted that the location of line 110 will change as the pastes shrink into the support structure, as indicated by the result of shrinkage which produced demarcation line 87 of FIG. 5.

Support structure 100 is removed from receiving fixture 106 and sent to an oven for drying. The preferred drying temperature is about 80 to 85 degrees C., and the duration of drying is in the range of 15 to 20 minutes. Drying serves to harden the solder glass paste and remove the more volatile portion of the vehicle.

Support structure 100 is then installed in a receiving fixture 106A in the second solder-glass paste-dispensing machine 104A. The orifice size of the paste-dispensing head 108A of the second machine 104A is made 0.187 inch in diameter because the thixotropic properties of the higher viscosity solder glass paste under shear make a larger orifice necessary.

In the second solder-glass dispensing machine 104A, the rail 100 is over-filled with a devitrifying solder glass paste of relatively high viscosity. This over-filling is indicated by FIG. 6B, in which solder glass paste 114 is depicted as extending from the support structure 100 in an "ice-cream cone" configuration. By way of example, the solder glass paste 114 may extend above the level of support structure 100 by about 0.150 inches. The over-filling of the support structure 100 is also indicated in FIG. 7, in which solder glass paste deposit 114, depicted as having been partially applied by the second solder-glass paste-dispensing machine 104A, is shown as overlying the deposit of solder glass paste 102.

After receiving deposits of solder glass pastes 102 and 114, the support structure 100 is removed from the receiving fixture 106A and re-directed to the drying oven described, again for a period of 15 to 20 minutes at a temperature in the range of 80 to 85 degrees C.

Figure 8:
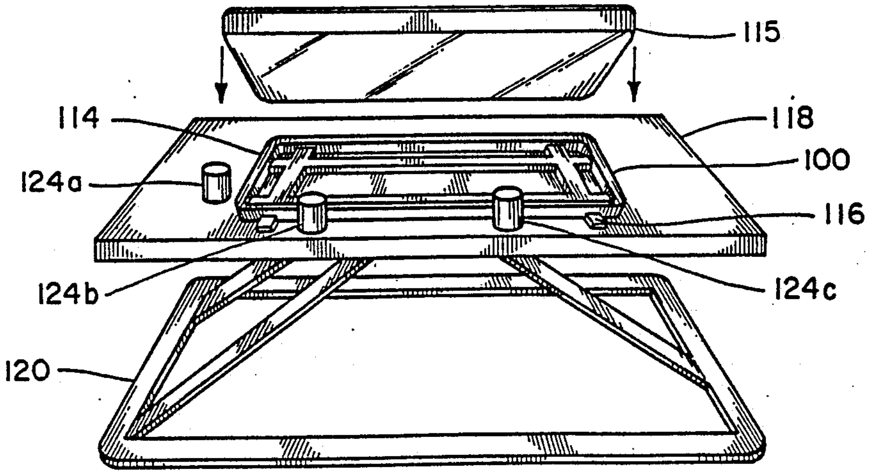
FIG. 8 is a view in perspective of a fixture for holding a faceplate and mask support structure in proper juxtaposition when passing through a sealing lehr.

With reference now to FIG. 8, a flat glass faceplate 115 as indicated by the associated arrows is about to be fixtured to rest upon devitrifying solder glass paste 114; that is, the solder glass paste that extends from the rail 100. The fixturing is accomplished by cradling the rail 100 in a holder 116 mounted on table 118 of a carrier base 120 for conveyance through a sealing lehr. Faceplate 115 is indicated as being in position for lowering (indicated by the associated arrows) onto the support structure 100 and in contact with the hardened solder glass paste 114.

The contact of the faceplate 100 with the solder glass paste 114 is depicted in greater detail in FIG. 6B. It will be noted that the solder glass paste 114 is shown as being strong enough to support the faceplate 115 without slumping or breaking—the strength of the hardness of the solder glass paste 114 is actually such that the seven pound weight of the faceplate 115 does not make even a slight impression on the dried paste.

Table 118 of FIG. 7 is tilted from a horizontal plane for the purpose of registering the faceplate 115 with the support rail 100. Three indexing posts **124*a*, 124*b* and 124*c* provide for contact with three areas on the sides of faceplate 115; these are well-known in the art as the "faceplate a-b-c points". The tilt of table 118 causes the faceplate 115, impelled by gravity, to rest against posts 124*a*, 124*b* and 124*c*, providing for exact registration of the faceplate 115 with the rail 100, noted as being cradled in the holder 116**.

The faceplate and support structure are then conveyed on carrier base 120 through a sealing lehr (not shown), where the assembly is heated by convection to a maximum sealing temperature of 440 degrees C. for a period of 35 to 70 minutes. The recommended rate of travel through the sealing lehr is about seven inches per minute, and the duration of the heating process is about 4-½ hours. The heating of the faceplate 115 and the support structure 100 to the temperature and duration of time cited is effective to shrink the two solder glasses 102 and 114 into the structure, and lower the faceplate 115 into contiguousness with the rail 100. The over-filling of the rail 100 also provides for a flow of solder glass paste to form fillets 88 and 90 which extend from rail 100, and which have seal geometries effective to seal the structure 100 to the faceplate 115.

As the carrier base 120 proceeds through the sealing lehr, the faceplate 115 and the filled rail 100 are heated to the previously noted temperature of 440 degrees C. to devitrify the solder glasses and permanently secure and seal structure 100 to faceplate 115.

Following the securing of the support structure on the faceplate, the panel with the permanently secured mask support structure is conveyed to a panel screening area for the photoscreening of the phosphor deposits on the screening area enclosed by the support structure. Following the photoscreening, a shadow mask under tension is welded to the support structure, after which a magnetic shield (an internal shield is indicated by reference No. 58 of FIG. 1) may also be welded to the support structure, and the resulting combination, now the "faceplate assembly", is returned to the same sealing lehr for sealing the funnel to the peripheral, funnel-receiving area of the faceplate (see reference No. 34 in FIGS. 1 and 2).

The two solder glasses 102 and 114, upon melting and devitrifying, shrink in volume by approximately 36 percent. The effect of such shrinkage is depicted in FIG. 5, wherein the devitrified solder glasses 84 and 86 are indicated as completely filling the hollow space of support structure 48. The overfilling also provides for the flow of solder glass paste to form fillets 88 and 90 which extend from support structure 48, as indicated.

The width of the gaps 92 and 94 resulting from a near-conjunction of the mask support structure 48 with the glass of the faceplate 24, is a function of the volume of the two solder glass pastes deposited within, and extending from, the top of the support structure (depicted in FIG. 6B). As has been noted, the desired width of the gaps is in the range of 0.001 inch to 0.005 inches, and preferably 0.002 inches. The depositing of too much solder glass will result in gaps that are too wide, and the depositing of too little solder glass will reduce the gaps to a point where the metal of the support structure can contact the glass, which may result in spalling of the glass at the points of contact. By way of example, and with respect to the cubic volume of the particular mask support structure depicted, approximately 90 grams of the 7590 (or CV-685), relatively low viscosity solder glass paste 102, provides an adequate filling. Approximately 58 grams of solder glass 7590 PM (or CV-695)—the relatively high viscosity solder glass paste 114—provides an adequate over-filling. The total volume of both solder glasses for this particular support structure configuration is 33.6 cc, by way of example.

The quantities of paste deposited are preferably controlled to within ±0.045 cc, or 0.13 percent.

Figure 12:
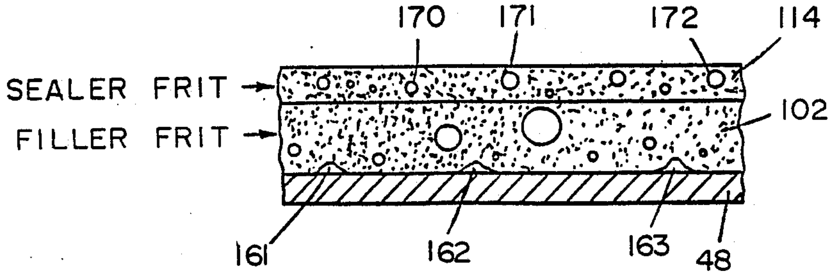
FIGS. 12 and 13 are microphotographs of longitudinal sections through a portion of the glass solder filled rails, respectively without and with the pre-treatment of the rails and frit.
Figure 13:
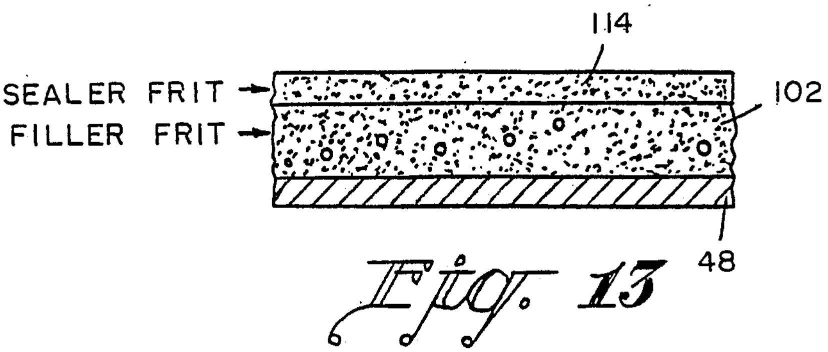

Referring to the microphotographs in FIGS. 12 and 13 of longitudinal fragmentary sections of actual rails with both layers of devitrified frit therein, FIG. 12 illustrates a typical rail manufactured in accordance with the parent application, U.S. Ser. No. 178,175, and FIG. 13 depicts a filled rail made in accordance with the same basic method but with the addition of the solder glass paste pre-treatment and the surfactant coating of the rail interior prior to frit dispensing.

Note in FIG. 12 that the low viscosity filler frit or solder glass after devitrification has pockets of air 161, 162 and 163 immediately adjacent the interior wall of the rail 48 and particularly at the apex of the walls of the rails (see FIGS. 6A and 6B). Small fissures may form joining these pockets with the main volume of the tube and these small volumes are difficult to pump through the restricted fissures and as a result the small voids degas into the finished tube giving objectionably high gas pressures.

As seen in the microphotograph of FIG. 13, these voids adjacent the apex of the rail have been eliminated by the surfactant wetting agent.

Also as seen in the microphotograph of FIG. 12, a plurality of air bubbles 170, 171, 172, etc. form in the high viscosity sealing frit layer 114 when utilizing the method according to the parent application. Such bubbles also form in the fillets 88 and 90. These voids have been substantially reduced, and in some cases completely eliminated as seen in FIG. 13 with the addition of pre-rolling the solder glass paste prior to dispense as described above in connection with FIGS. 10 and 11. Note also that the intermediate pockets in the solder glass filler layer 102 have been reduced as seen in FIG. 13 also by pre-rolling in the same manner.

In connection with these two techniques; namely, pre-rolling the paste and wetting the rail interior with a surfactant and the resulting effects, it should be understood that these two effects are distinct from one another because they have been evaluated and tested separately so that the results described above attributable to each are verifiably separate.

What is claimed is:

1. A method of making a mask support structure for a cathode ray tube, including the steps of: slowly rotating a quantity of solder glass paste in a container continuously over an extended period of time so that its viscosity is significantly below an original value, permitting the rotated solder glass paste to stand substantially still until it returns near its original viscosity value, dispensing the solder glass paste in a metallic mask support rail having a generally hollow cross-section, and connecting the rail to a CRT faceplate.

2. A method of making a mask support structure for a cathode ray tube as defined in claim 1, wherein the step of rotating the quantity of solder glass paste includes rolling it about a horizontal axis for approximately 8 to 12 hours.

3. A method of making a mask support structure for a cathode ray tube as defined in claim 2, wherein the step of permitting the rotated quantity of solder glass paste to stand includes permitting it to stand for almost 12 hours.

4. A method of making a mask support structure for a cathode ray tube as defined in claim 1, wherein the step of dispensing includes slowly stirring the solder glass paste as it is being dispensed in the rail.

5. A method of making a mask support structure for a cathode ray tube as defined in claim 4, wherein the step of slowly stirring the solder glass paste as it is being dispensed in the rail includes stirring it at approximately 4 rpm.

6. A method of making a mask support structure for a cathode ray tube, including the steps of: slowly rotating a quantity of solder glass paste in a container continuously over a period of at least 8 hours so that its viscosity is reduced significantly below an original value, permitting the rotated solder glass paste to stand substantially still until it returns near its original viscosity value, dispensing the solder glass paste in a metallic mask support rail having a hollow interior, and connecting the rail to a CRT faceplate.

7. A method of making a mask support structure for a cathode ray tube as defined in claim 6, wherein the step of rotating the quantity of solder glass paste includes rolling it about a horizontal axis for approximately 8 to 12 hours, and wherein the step of permitting the rotated quantity of solder glass paste to stand includes permitting it to stand for about 12 hours.

8. A method of making a mask support structure for a cathode ray tube, including the steps of: rolling a substantial quantity of relatively low viscosity solder glass paste in a container about a horizontal axis at about 4 rpm for a time in excess of four hours sufficient to remove a substantial amount of entrapped air therein and to substantially reduce the viscosity thereof, permitting the quantity of solder glass paste to stand for a period of at least two hours so the viscosity thereof approaches its original value, dispensing a relatively low viscosity solder glass paste into a mask support rail having a generally "V" shaped cross-section, dispensing a portion of the high viscosity rolled solder glass paste over the low viscosity solder glass plate, and connecting the resulting solder glass paste filled rail to a CRT faceplate with the application of heat, whereby air entrapped in the high viscosity solder glass paste is prevented from forming pockets of air in the resulting devitrified solder glass formed by the high viscosity solder glass paste that otherwise may cause gas and charged particles bursting into an assembled CRT.

9. A method of making a mask support structure for a cathode ray tube as defined in claim 8, wherein the step of rolling the quantity of solder glass paste includes rolling it for a period of between 8 to 12 hours, the step of permitting the quantity of solder glass paste to stand includes permitting the solder glass paste to stand for approximately 12 hours.

10. A method for making a mask support structure for a cathode ray tube as defined in claim 8, wherein the step of rolling the quantity of solder glass paste includes rolling it in its original container as manufactured.

11. A method of making a mask support structure for a cathode ray tube, including the steps of: rolling a substantial quantity of relatively high viscosity solder glass paste in a container about a horizontal axis for a time in excess of 8 to 12 hours sufficient to remove a substantial amount of entrapped air therein and to substantially reduce the viscosity thereof, permitting the quantity of solder glass paste to stand for a period of about 12 hours so the viscosity thereof approaches its original value, dispensing a relatively low viscosity solder glass paste into a mask support rail having a generally "V" shaped cross-section, dispensing a portion of the high viscosity rolled solder glass paste over the low viscosity solder glass paste, and connecting the resulting solder glass paste filled rail to a CRT faceplate with the application of heat, whereby air entrapped in the high viscosity solder glass paste is prevented from forming pockets of air in the resulting devitrified solder glass formed by the high viscosity solder glass paste that otherwise may cause gas and charged particles bursting into an assembled CRT, the step of rolling the quantity of solder glass paste includes rolling it in its original container as manufactured.

* * * * *